United States Patent
Cox et al.

(10) Patent No.: US 9,280,155 B2
(45) Date of Patent: Mar. 8, 2016

(54) AIRCRAFT GROUND TRAVEL TRACTION CONTROL SYSTEM AND METHOD

(71) Applicant: Borealis Technical Limited, London (GB)

(72) Inventors: Isaiah W. Cox, Baltimore, MD (US); Rodney T. Cox, North Plains, OR (US); Jan Vana, Ricany (CZ); Jonathan S. Edelson, Portland, OR (US)

(73) Assignee: Borealis Technical Limited, Gibraltar (GI)

( * ) Notice: Subject to any disclaimer, the term of this patent is extended or adjusted under 35 U.S.C. 154(b) by 158 days.

(21) Appl. No.: 13/691,828

(22) Filed: Dec. 2, 2012

(65) Prior Publication Data

US 2015/0253773 A1    Sep. 10, 2015

Related U.S. Application Data

(60) Provisional application No. 61/566,375, filed on Dec. 2, 2011.

(51) Int. Cl.
| | |
|---|---|
| G05D 1/00 | (2006.01) |
| B64C 25/50 | (2006.01) |
| B64C 25/40 | (2006.01) |
| G05D 1/02 | (2006.01) |
| G05D 13/62 | (2006.01) |
| G05D 17/02 | (2006.01) |

(52) U.S. Cl.
CPC ............ *G05D 1/0083* (2013.01); *B64C 25/405* (2013.01); *G05D 1/0202* (2013.01); *G05D 13/62* (2013.01); *G05D 17/02* (2013.01)

(58) Field of Classification Search
USPC .................................................. 701/3; 244/50
See application file for complete search history.

(56) References Cited

U.S. PATENT DOCUMENTS

| | | | |
|---|---|---|---|
| 5,450,324 A | 9/1995 | Cikanek | |
| 6,002,979 A | 12/1999 | Ishuzu | |
| 6,007,454 A | 12/1999 | Takahira et al. | |
| 6,532,833 B1 * | 3/2003 | Lec ........................ | 73/862.338 |
| 6,577,944 B1 | 6/2003 | Davis | |
| 6,657,334 B1 | 12/2003 | Edelson | |
| 6,838,791 B2 | 1/2005 | Edelson | |
| 7,116,019 B2 | 10/2006 | Edelson | |
| 7,445,178 B2 | 11/2008 | McCoskey et al. | |
| 7,469,858 B2 | 12/2008 | Edelson | |
| 7,891,609 B2 | 2/2011 | Cox | |
| 2002/0117012 A1 * | 8/2002 | Lec ........................ | 73/862.338 |
| 2003/0120413 A1 * | 6/2003 | Park et al. ..................... | 701/71 |
| 2006/0212161 A1 * | 9/2006 | Bhat et al. ..................... | 700/197 |
| 2006/0273686 A1 | 12/2006 | Edelson et al. | |
| 2008/0147252 A1 * | 6/2008 | Bayer ............................. | 701/3 |
| 2009/0024269 A1 * | 1/2009 | Shorten et al. ................. | 701/29 |
| 2009/0186535 A1 * | 7/2009 | Sullivan ......................... | 440/6 |
| 2010/0063703 A1 * | 3/2010 | Clothier ......................... | 701/90 |
| 2010/0271191 A1 * | 10/2010 | de Graff et al. .............. | 340/447 |
| 2012/0277943 A1 * | 11/2012 | Kim ................................ | 701/22 |
| 2013/0240664 A1 * | 9/2013 | Cox et al. ....................... | 244/50 |
| 2014/0027571 A1 * | 1/2014 | Barmichev et al. ......... | 244/103 R |
| 2015/0005988 A1 * | 1/2015 | Cox ................................. | 701/3 |

* cited by examiner

*Primary Examiner* — Thomas G Black
*Assistant Examiner* — Tyler Paige

(57) ABSTRACT

A traction control system and method are provided for an aircraft equipped with a ground travel drive system with drive wheels powered by onboard wheel drive means that are capable of translating torque through the aircraft drive wheels and that are automatically controllable to control traction without reliance on the aircraft's brakes to keep the aircraft moving efficiently and autonomously on the ground under a range of environmental conditions.

16 Claims, 7 Drawing Sheets

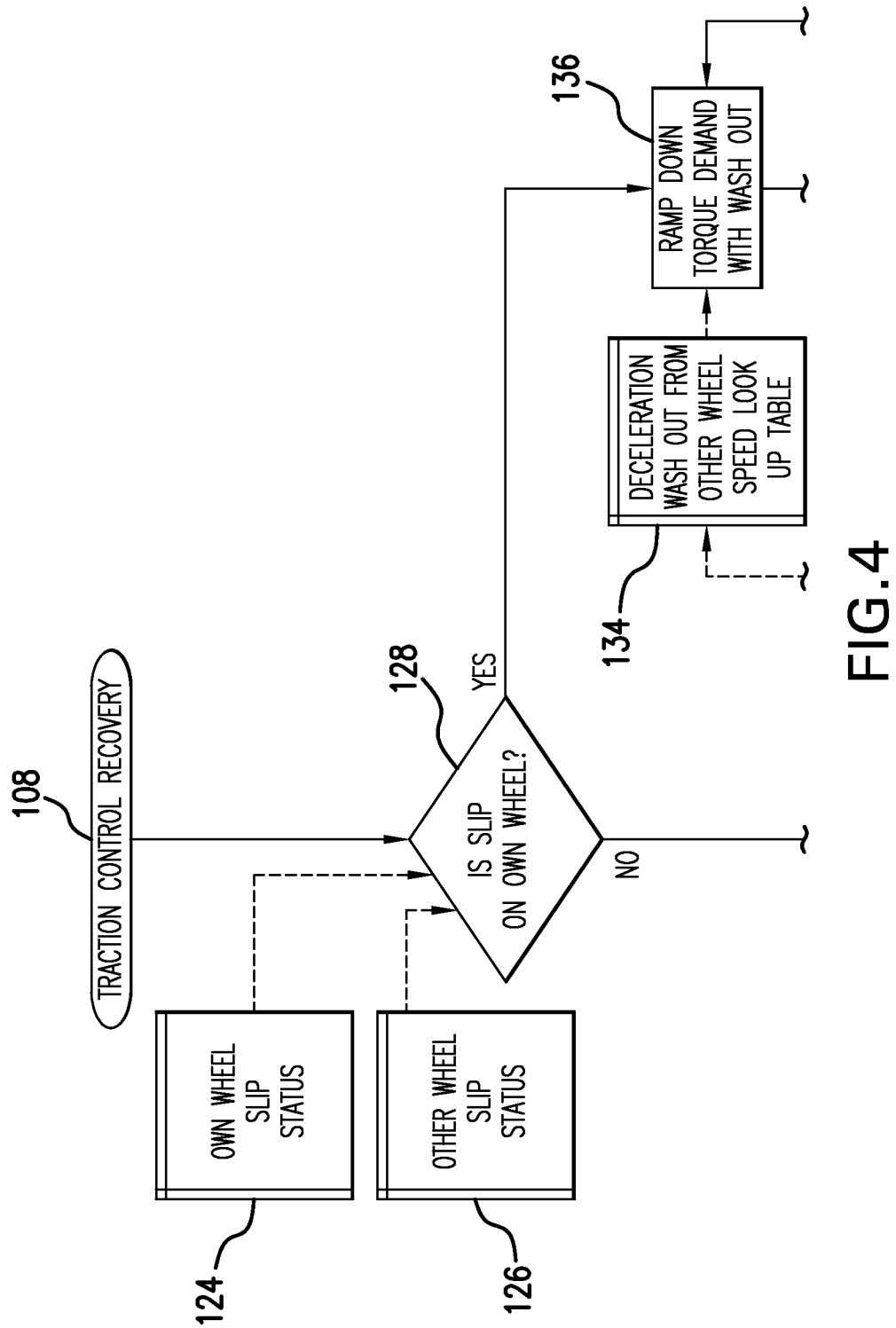

AIRCRAFT GROUND TRAVEL TRACTION CONTROL SYSTEM AND METHOD

PRIORITY CLAIM

This application claims priority from U.S. Provisional Application No. 61/566,375, filed 2 Dec. 2011, the disclosure of which is fully incorporated herein.

TECHNICAL FIELD

The present invention relates generally to traction control systems and specifically to a ground travel traction control system for aircraft.

BACKGROUND OF THE INVENTION

Traction control systems help to prevent or limit a vehicle's wheels from slipping during acceleration on different surfaces. Traction of a vehicle is established as its wheels contact a surface so that when the wheels are rotated, usually by a driving force, the vehicle will be moved along the surface in a desired direction. The combination of the coefficient of friction and the force exerted by a wheel against the surface produces traction. When the coefficient of friction of the surface is less than the force exerted, the wheel will slip during acceleration of the vehicle, adversely affecting acceleration performance and driving stability. Slippage can occur as a result of excessive accelerative forces applied to vehicle wheels or inadequate wheel to surface friction that can be present with wet or icy conditions. Once the condition is recognized, a vehicle driver, particularly in an automobile or like vehicle, may try to control slippage by reducing engine power or by applying the brakes, both of which can reduce the speed at which a drive wheel is rotating. The driver may not be aware that slippage is occurring, however, and may not be able to take corrective action as quickly as required.

Aircraft are required to travel along the ground between landing and takeoff, and traction control during taxi can be a challenge, particularly under adverse weather or runway conditions. Aircraft ground travel is presently conducted by using thrust from the aircraft's main engines and/or tow vehicles to move aircraft between runways and gates after landing and prior to takeoff. Apart from the application of the aircraft's brakes, effective and reliable traction control has not heretofore been possible during this type of aircraft ground movement. Moving an aircraft on the ground without the use of a tug or tow vehicle or the aircraft's engines has been proposed. For example, U.S. Pat. No. 7,891,609 to Cox et al, owned in common with the present application, describes moving an aircraft along taxiways using at least one self propelled undercarriage wheel. McCoskey et al describes a powered nose aircraft wheel system useful in a method of taxiing an aircraft that can minimize the assistance needed from tugs and the aircraft engines in U.S. Pat. No. 7,445,178. Neither the need for traction control nor a system that reliably controls traction in an aircraft during ground travel is suggested in either of these patents.

Various traction control systems have been proposed for automobiles and like vehicles to automatically adjust traction between the vehicle's drive wheels and the road or ground surface to minimize acceleration slip. These include, for example, systems that control traction using braking force adjustment, engine throttle control, and engine fuel supply control. Other traction control systems for automotive use have also been proposed. In U.S. Pat. No. 6,002,979 to Ishizu (Nissan), for example, an automobile traction control system in combination with a fuel supply system that adjusts driving torque delivered to each drive wheel by adjusting engine power is described. This system monitors slipping of a drive wheel with respect to a target drive wheel speed and includes engine control means that cooperates with a fuel supply system to decrease engine power by decreasing fuel supplied in response to a detected slipping condition. This system is sensitive to preventing engine stall when the speed of the drive wheel is reduced to a target drive wheel speed. A plurality of sensors is employed to assist with the electronic control of the Ishizu traction control system.

The traction control device disclosed in U.S. Pat. No. 6,007,454 by Takahira et al (Toyota) automatically detects slipping conditions of each of the pairs of wheels in a four wheel drive automobile by comparing the mean rotational speed of the front or rear drive wheels to a threshold value. A brake system is electronically controlled to apply brakes to at least one of the pairs of front or rear wheels, thereby executing traction control according to a selected gear transmission ratio. When optional vehicle speed sensors are included in this system and wheel rotation speeds are compared to vehicle speed, the automobile's engine can be controlled to decrease rotational power output. Neither of the systems described in the aforementioned patents is disclosed to have any utility beyond automotive applications or under conditions likely to be encountered by taxiing aircraft, however.

Traction control systems useful in hybrid and electric vehicles, primarily automobiles, have also been proposed. U.S. Pat. No. 5,450,324 to Cikanek (Ford), for example, discloses a combined traction control and antiskid braking system operatively connected to an electric traction motor and a hydraulic braking system. Present vehicle parameters are monitored by sensors, and a processor responsive to the sensors calculates vehicle parameters not directly measurable to determine whether the vehicle state requires traction control or braking control. A control strategy based on the determined vehicle state is used by the processor to provide commands to a motor controller to control operation of the electric traction motor by reducing motor torque if traction control is appropriate or, alternatively, to a brake controller if hydraulic or regenerative antiskid braking control is needed. The main focus of the traction control and braking system disclosed by Cikanek is to maximize regenerated kinetic energy during braking and minimize kinetic energy loss due to wheel slip, primarily to overcome battery energy storage limitations. The application of this system to hybrid and electric vehicles or conditions beyond those described is not suggested.

The traction control system described in U.S. Pat. No. 6,577,944 by Davis uses existing engine speed sensors to determine the occurrence and degree of wheel slippage by comparing whether two successive engine speed readings exceed a selected threshold and generates an automatic proportional corrective action from the vehicle's engine, braking system, or both. This system is designed primarily for automotive internal combustion engines and/or electric motors. Nonautomotive uses in which a drive unit applies torque to a rotating component that must overcome resistance, such as in a turbine rotated by an electric drive motor and in a power boat with an internal combustion engine-driven propeller or screw, are also contemplated. As with the systems discussed above, the utility of this traction control system is limited primarily to automotive applications, and the control of traction in aircraft ground travel is not even remotely suggested.

A need exists for a traction control system designed to enable aircraft equipped with ground movement drive systems to be driven effectively and reliably during autonomous ground travel under a variety of weather and ground surface conditions without reliance on the aircraft's brakes or limitation by ground surface condition. The prior art fails to provide such a system.

SUMMARY OF THE INVENTION

It is a primary object of the present invention, therefore, to overcome the deficiencies of the prior art and to provide a traction control system that enables aircraft equipped with ground movement drive systems to be driven effectively and reliably during autonomous ground travel without reliance on the aircraft's brakes or limitation by ground surface condition.

It is another object of the present invention to provide a traction control system for an aircraft equipped with onboard wheel drive means capable of translating torque through aircraft wheels and automatically controllable to move the aircraft efficiently on the ground under a range of environmental conditions.

It is an additional object of the present invention to provide a traction control system for an aircraft equipped with a ground movement control system with a pair of nose wheel drive wheels that automatically determines wheel slippage and automatically generates corrective action.

It is a further object of the present invention to provide a method for reliably and effectively controlling traction in an aircraft ground travel drive system for aircraft equipped with onboard wheel drive means capable of translating torque through aircraft wheels and automatically controllable to move aircraft efficiently and autonomously on the ground under a range of environmental conditions without reliance on the aircraft's brakes.

In accordance with the aforesaid objects, the present invention provides a traction control system and method for an aircraft equipped with a ground travel drive system including onboard wheel drive means that are capable of translating torque through aircraft drive wheels and that are automatically controllable to control traction without reliance on the aircraft's brakes to keep the aircraft moving efficiently and autonomously on the ground under a range of environmental conditions.

Other aspects of the present aircraft ground travel traction control system and objects of the present invention will become apparent from the following description, drawings, and claims.

DESCRIPTION OF THE INVENTION

Traction control in an aircraft equipped with at least a pair of drive wheels as described in detail below requires reducing the rotational speed of the drive wheels to match the aircraft travel speed over a runway or taxiway surface. In aircraft, wheel rotational speed is generally reduced by braking, although the reduction of the fuel supplied or the timing of the fuel supplied to the aircraft engine when engine thrust is used to produce aircraft ground movement can also reduce speed. Driving traction in an aircraft is produced by the force of the aircraft's wheels against the ground surface and the surface coefficient of adhesion or friction, $\mu$. The force of a wheel, which is directed perpendicularly toward the ground surface, may be described as including a proportional force normal to the surface and a proportional force parallel to the surface. The proportional force normal to the surface is part of the traction frictional force. If a sufficiently large torque or drive force is applied from the wheel to the ground surface tangent to a contact point between the wheel and the surface, the frictional grip, or static friction, between the wheel and the surface will be overcome. This causes the wheel to slip in relation to the surface so that the wheel is rotating at a higher surface speed than its forward travel velocity, which creates a greater opportunity for slippage of the wheel. When a driving torque is applied to an aircraft tire through the wheel, a tractive force, proportional to $\mu$, develops at the area where the tire contacts the ground surface. The tire tread in front of and within in the contact area is subject to compression while the wheel is being driven. As a result, the distance the tire travels when subjected to a driving torque will be less than when the tire is free rolling. Unless restrained and/or corrected, the wheel will continue to rotate at an increasingly faster speed, and continued control of aircraft speed or travel direction presents challenges.

As indicated above, the automatic control of wheel slippage against a road surface in automobiles and the like is well known. The control of wheel slippage in aircraft during ground travel, however, has not been similarly addressed. Until the present invention, aircraft traction control has relied on a system of mechanical sensors to measure and detect when a wheel is skidding or slipping, and braking force is hydraulically released on that wheel, which allows the aircraft to control skidding regardless of ground surface conditions. Unlike automobiles, which may have two to four drive wheels and can transfer power from one wheel to another through a differential to control traction, aircraft have not been equipped with drive wheels for ground movement. Consequently, aircraft have had to rely on the use of the hydraulic braking system for traction control.

Figure 1A:
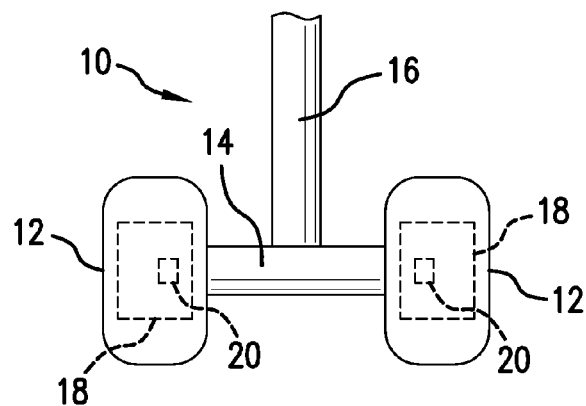
FIG. 1a is a diagrammatic illustration of a pair of aircraft drive wheels including traction control system components in accordance with the present invention.
Figure 1B:
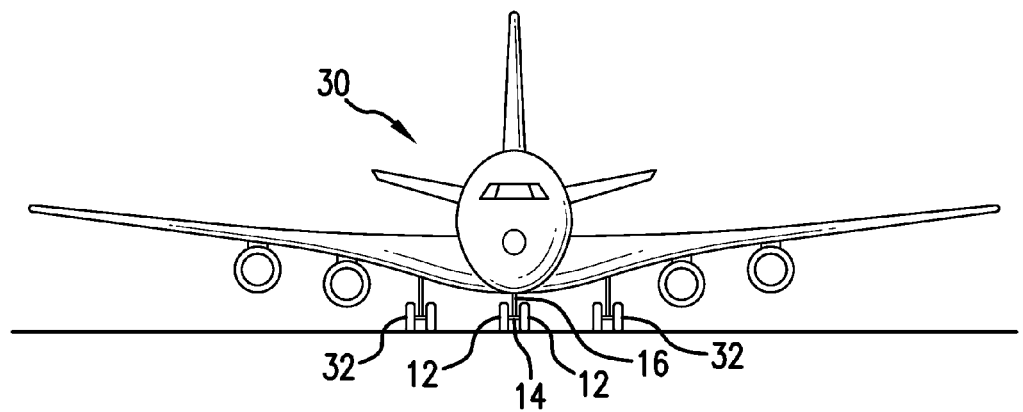
FIG. 1b shows the aircraft drive wheels of FIG. 1a located on a nose landing gear of an aircraft.

Referring to the drawings, FIG. 1a is a diagrammatic illustration of one possible arrangement of an aircraft drive wheel assembly 10 with a pair of drive wheels. Two wheels (not specifically shown), which are preferably aircraft landing gear nose wheels, support tires 12 and are rotatably mounted at opposite ends of an axle 14. The axle 14 is mounted on a landing gear strut 16 that is connected to the body of an aircraft 30 (FIG. 1b). Each drive wheel is driven by an onboard drive means 18 mounted in driving relationship to and in communication with the wheels and axle 14.

The onboard drive means 18 are shown mounted within the wheels, which is only one possible drive means location. Other possible locations for a drive means in addition to those within or adjacent to a wheel include, without limitation, on or near the wheel axle, in, on or near a landing gear bay or landing gear component, or any convenient onboard location in, on, or attached to the aircraft. All of these onboard drive means locations are contemplated to be within the scope of the present invention. Additionally, while the nose landing gear wheels are the preferred drive wheels for use in the traction control system of the present invention, one or more pairs of an aircraft's main landing gear wheels 32 (FIG. 1b) could also be drivingly connected to onboard drive means 18 and used as drive wheels.

The term "drive means" as used herein generally refers to any engine or non-engine onboard drive means, whether or not located in a wheel, capable of moving an aircraft on the ground. A drive means preferred for use with the system and method of the present invention is an electric drive means or motor assembly that is preferably an enclosed machine capable of operating for at least several minutes at maximum torque and for over 20 minutes at cruise torque.

An electric motor preferred for use with the ground travel traction control system and method of the present invention could be any one of a number of designs, for example an inside-out motor attached to a wheel hub in which the rotor can be internal to or external to the stator, such as that shown and described in U.S. Patent Application Publication No. 2006/0273686, the disclosure of which is incorporated herein by reference. A toroidally-wound motor, an axial flux motor, a permanent magnet brushless motor, a synchronous motor, an asynchronous motor, a pancake motor, a switched reluctance motor, electric induction motor, or any other electric motor geometry or type known in the art is also contemplated to be suitable for use in the present invention.

Other motors suitable for this purpose that can be used as drive means in an aircraft environment include pneumatic motors driven by bleed air. Additionally, although not preferred, drivers or motors driven by thrust directly from the engines or by any other appropriate type of propulsion system are contemplated for use in the traction control system of the present invention.

The drive means selected should be able to drive an aircraft wheel at a desired speed and torque capable of moving an aircraft on the ground at runway speeds. One kind of electric drive motor preferred for this purpose is a high phase order electric motor of the kind described in, for example, U.S. Pat. Nos. 6,657,334; 6,838,791; 7,116,019; and 7,469,858, all of which are owned in common with the present invention. A geared motor, such as that shown and described in U.S. Pat. No. 7,469,858, is designed to produce the torque required to move a commercial sized aircraft at an optimum speed for ground movement. The disclosures of the aforementioned patents are incorporated herein by reference. Other motor designs capable of high torque operation across the desired speed range that can move an aircraft wheel to function as described herein may also be suitable for use in the present invention. A particularly preferred motor is a high phase order induction motor with a top tangential speed of about 15,000 linear feet per minute and a maximum rotor speed of about 7200 rpm. With an effective wheel diameter of about 27 inches and an appropriate gear ratio, an optimum top speed of about 28 miles per hour (mph) can be achieved, although any speed appropriate for aircraft ground travel in a particular runway environment could be achieved.

Moving an aircraft on the ground using an onboard drive means as described above requires providing sufficient power to the drive means to produce a torque capable of driving an aircraft wheel to move the aircraft at a desired ground or taxi speed. Drive means preferred for the present system and method are electric motors. The current, and the voltage and frequency of the current, applied to the motor can be controlled to regulate speed. In an aircraft wheel drive assembly useful in the present invention, current to power the motor preferably originates with the aircraft auxiliary power unit (APU). Other power sources could also be used to supplement or replace the APU as a source of power. These power source can include, for example without limitation, an aircraft engine auxiliary power unit, fuel cells, any kind of solar power units, POWER CHIPS™, batteries, and burn boxes, as well as any other suitable power source effective for this purpose. If the drive means selected for use in the present traction control system is a pneumatic motor, power could be supplied by the main engines, the main engines' auxiliary power units, and/or thrust from the main engines. Control of the flow of current to the drive means, as well as the voltage and frequency of the current, allows the torque generated by the drive means to be controlled and, consequently, the speed of the wheel powered by the drive means and the ground travel speed of the aircraft to be controlled. This type of control can be achieved with any of the aforementioned power sources. Depending on the specific power source used, modification of the control of current flow to the drive means to generate the desired torque may be required.

The operation of an effective aircraft ground movement traction control system can be described generally as follows, although variations that accomplish the same purpose are contemplated to be within the scope of the present invention. Information relating to the speed of the aircraft as it travels along the ground and the speed or torque of the aircraft's drive wheels must be obtained. Wheel speed and/or torque may be measured directly by wheel sensors 20 (FIG. 1a) or other sensors that provide wheel speed and/or torque information and may be located in each aircraft nose or other drive wheel or in any other location suitable for obtaining the desired information. If the onboard drive means is an electric motor, wheel speed can be inferred from motor torque, current, or frequency. In addition, steering can affect wheel speed and may need to be taken into consideration. Any method or device by which aircraft wheel speed and/or torque can be determined, directly or indirectly, during ground travel is contemplated to be within the scope of the present invention.

Aircraft speed is difficult to measure directly, but may be inferred from the measurement of other parameters, for example, from a rolling sum of the speeds of the two aircraft drive wheels in an aircraft equipped with a pair of drive wheels. This may require adjustment based on steering inputs from the aircraft pilot. Aircraft speed can also be inferred from the measurement of the speed of other aircraft components associated with the wheels, including gears, tires, and/or any other component that rotates with a speed proportional to the speed of the aircraft. Aircraft systems that have speed sensing capability could additionally be used to determine aircraft speed. These systems include, for example without limitation, global positioning systems (GPS), an airport radar grid, and aircraft air data instruments. Direct measurement of aircraft true speed may also be made by a sensor designed to measure aircraft speed accurately and quickly, such as, for example, a type of accelerometer. Any sensor employed for this purpose will have to take into account that a drive wheel can itself move for some distance without moving the aircraft on which it is mounted. Any device or method known in the art that can be used to provide a value for aircraft ground speed is contemplated for use with the traction control system and method of the present invention.

The determined or measured aircraft speed value and the measured speed and/or torque of each individual wheel in the pair of aircraft drive wheels are communicated to a processor and compared. When the speed of one drive wheel is significantly higher than the speed of the other drive wheel, the processor is programmed to automatically and quickly cause the wheel torque to drop to zero, wait for the wheel speed to match the aircraft ground speed, and then increase the wheel torque. The recognition of a sudden increase in speed or acceleration of one drive wheel and the immediate reduction of applied torque controls traction as the aircraft continues its ground travel. When the speed of the previously accelerating wheel decreases to a selected reference velocity, torque can be increased to a value just below the torque value that caused the wheel to slip or skid. The traction control system of the present invention can infer sudden acceleration, indicating wheel slippage, by comparing the speeds or velocities of the two (left and right) drive wheels. In the event that both drive wheels lose traction and indicate slippage simultaneously, control over both wheels can be gained by comparing their speeds or velocities with the reference velocity, and torque to both wheels can be adjusted accordingly. It is possible that if both wheels slip and lose traction in the same way, the aforementioned process will not detect loss of traction. A solution to this situation would be to pulse the torque differentially between the two wheels. If there is slippage or a skid state, one wheel will clearly accelerate beyond the other. This situation may be seen when the wheels are starting up from zero speed and the calculated reference aircraft ground speed is also zero. Under low friction conditions, the system will allow both wheels to turn and slowly accelerate together without actually moving the aircraft, a result of tight traction control "fooling" the reference speed calculation. Pulsing the torque differentially between the wheels should avoid this.

Since the reference velocity tends to change very slowly due to constraints, it can be used effectively to determine wheel slippage. The maximum torque applied by the traction control system should not be indicative of a runaway state, but should be only slightly higher than that associated with the inferred aircraft ground travel speed. If traction is lost, the wheel will not be spinning at a high speed, which increases the effectiveness of traction control in accordance with the present invention.

In addition to the methods discussed above, wheel slip could be inferred from comparing the individual drive wheel speeds to each other, and also from comparing wheel speed to other data sources, such as, for example, global positioning systems (GPS) data, radio data, visual data, laser data, accelerometer data, and/or any other sources of data known in the art, including what is known to be possible. One example of this would be too-fast acceleration. Pulsing faster and/or slower commands to the wheel to determine ease of reaction is another method that could be used to identify wheel slip.

The processor preferred for use with the present traction control system and method can be any one of a number of known microcomputers and similar processors effective for the purposes described herein. A preferred processor will include intelligent software capable of modulating maximum applied torque based on drive wheel ground slip. The intelligent software essentially learns as it receives the relevant information and can filter pilot torque commands in view of environmental conditions affecting traction control. This capability enables the system to remember previously made adjustments so that wheel speed and/or torque can be automatically adjusted as required to maintain optimum traction and keep an aircraft moving on the ground.

Various hunting techniques can be employed to determine ideal torques for a wide range of possible traction control situations and conditions. For example, requirements for traction control differ in different geographic locations at different times of the year. The processor of the present traction control system could be programmed to obtain information from the aircraft GPS and/or historical data added to the system so that the system is able to determine where the aircraft has landed, the air and ground surface temperatures and likely ground surface conditions for the location and time of year, and possible acceleration likely under the conditions from the sensed and historical data. An aircraft landing and subsequent ground travel in Oslo in January or in Tucson in August can present very different traction control considerations. The present traction control system enables an aircraft to adapt automatically to maintain optimum traction for specific conditions likely to be encountered. The more data available to the system for processing, the more quickly and effectively it will be able to provide the traction control required to maintain aircraft ground travel in a specific environment. Control algorithms can be precisely designed to take the actions required in a particular location during a particular season and may allow or prohibit wheel spinning if demanded, for example, depending on what is appropriate.

The capabilities and performance of the onboard drive means used to power the aircraft drive wheels must also be considered in providing optimum traction control. For example, an aircraft propelled along the ground by a selected onboard drive means will be able to achieve a defined maximum acceleration rate, which will be affected by factors such as, for example, whether the runway or taxiway traveled has a downhill slope, whether there is a tail wind during taxi, and the like.

It is contemplated that the present traction control system will include manual cockpit controls as well as the automatic processor and intelligent software responses to traction situations described to enable pilot input when warranted. Automatic control of traction typically produces quicker responses than manual control. One situation in which pilot input to the present traction control system can be effectively employed, however, is when there is a loss of traction involving one or more drive wheels on an icy runway or taxiway surface. Pilot input can be used to spin the involved wheel just above the traction point. The heat produced by the quickly spinning wheel can melt the ice on the ground surface under the wheel so that normal traction can be obtained. Alternatively, deicing achieved by spinning an involved drive wheel could be accomplished automatically with processor software.

Figure 2:
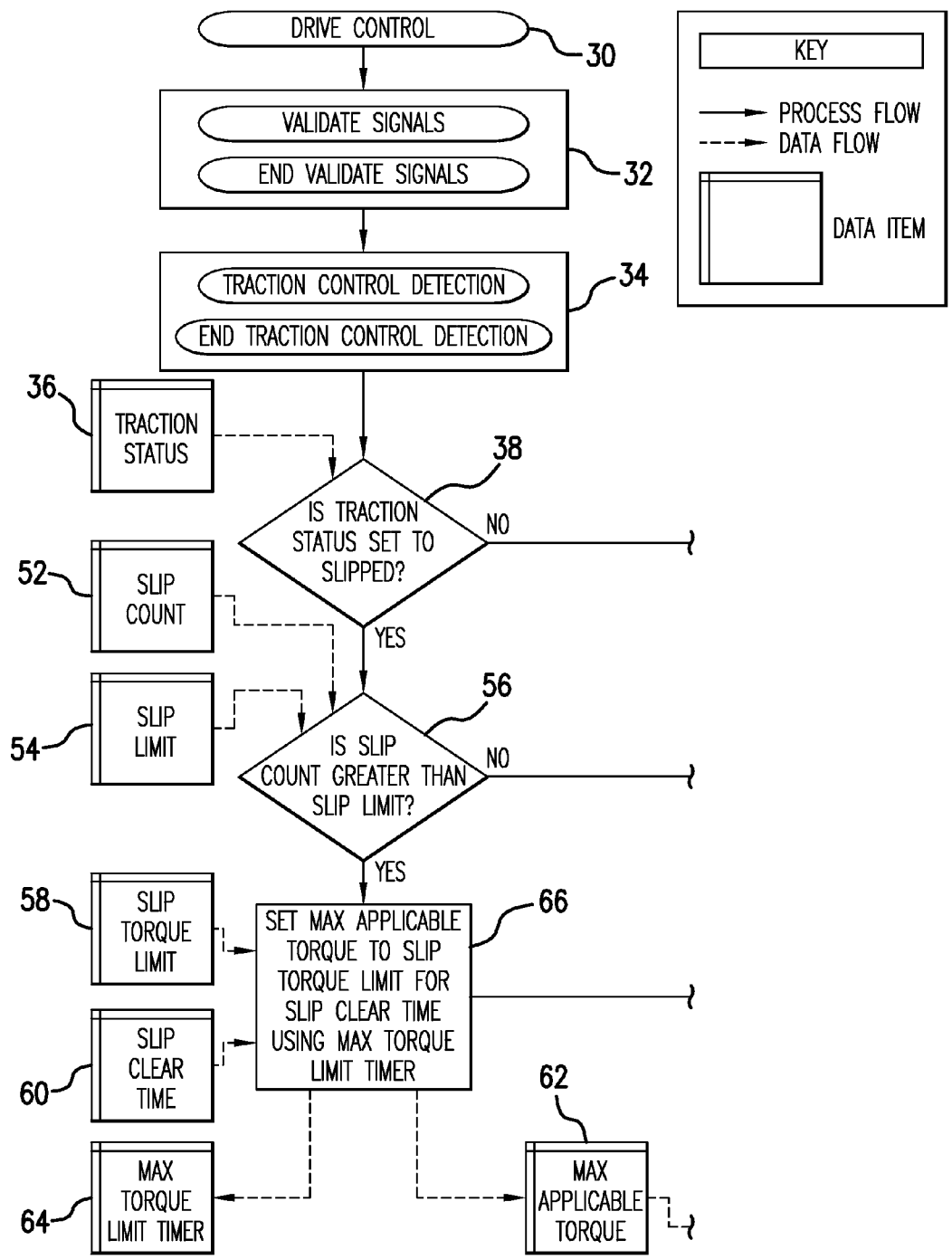
FIG. 2 is a flow chart reflecting one possible algorithm for controlling the onboard drive wheel drivers in accordance with the present invention.
Figures 1, 2:
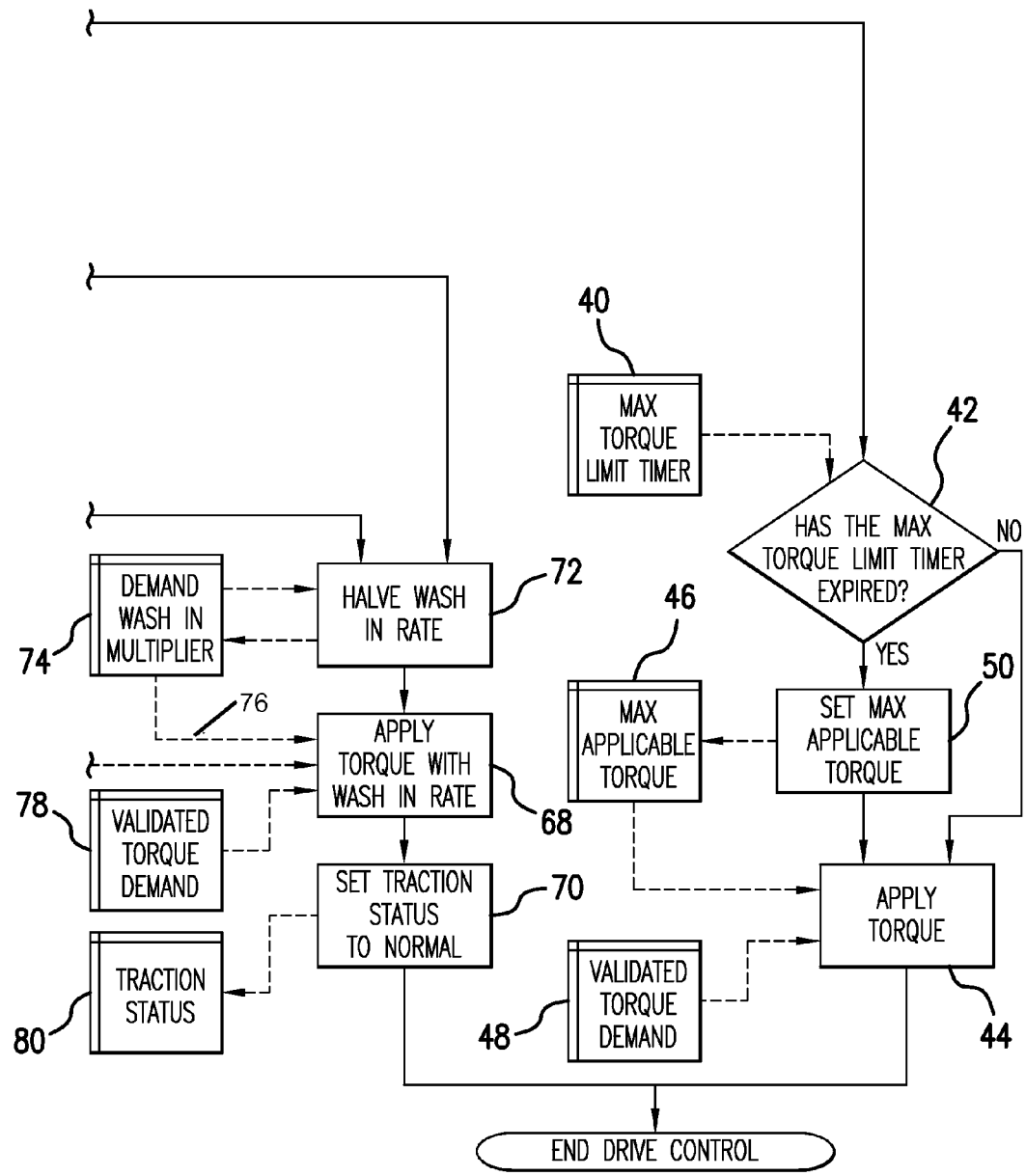
Figure 3:
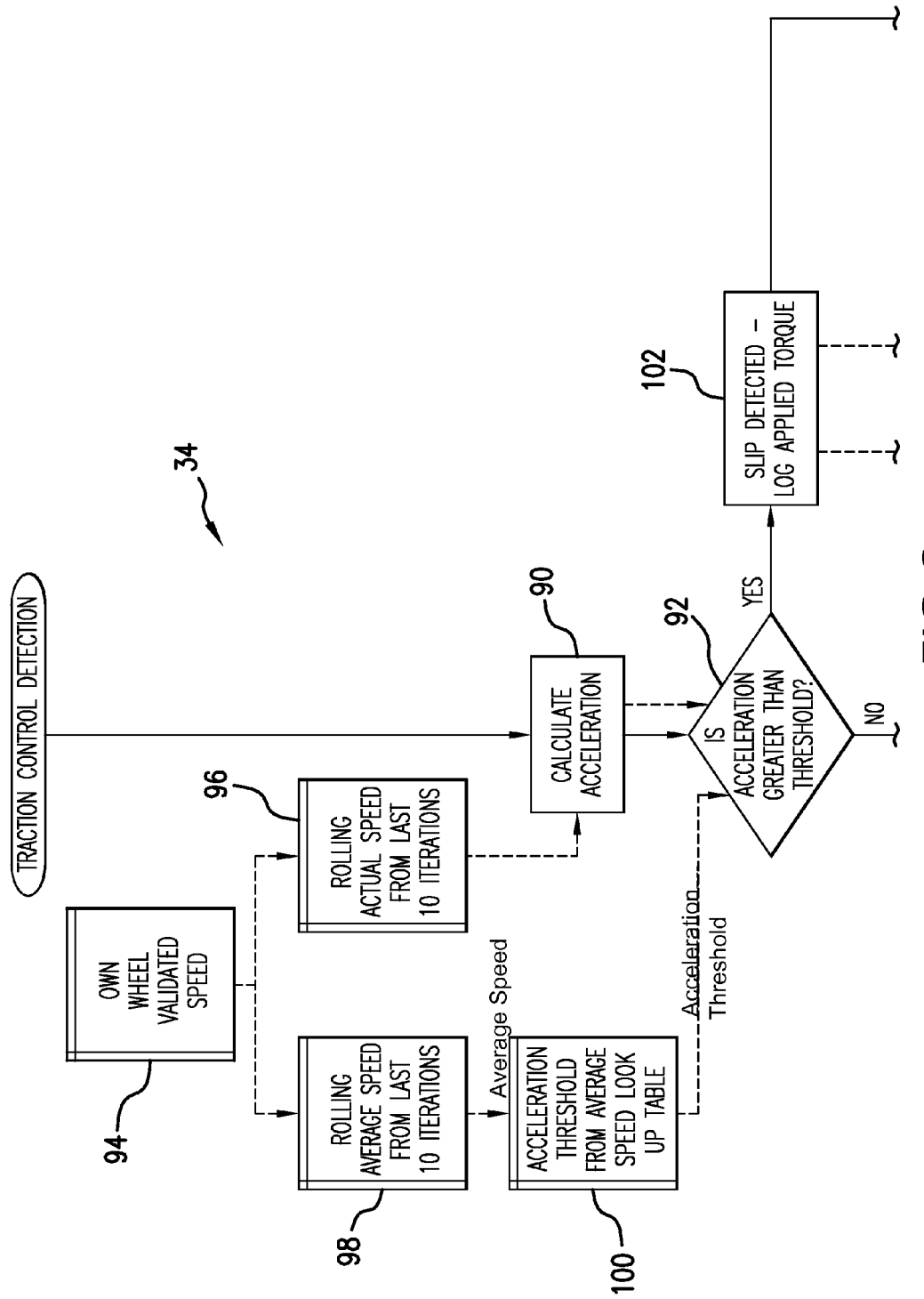
FIG. 3 is one embodiment of a flow chart depicting traction control detection in a traction control system for an aircraft equipped with drive wheels for ground travel according to the present invention.
Figures 1, 3:
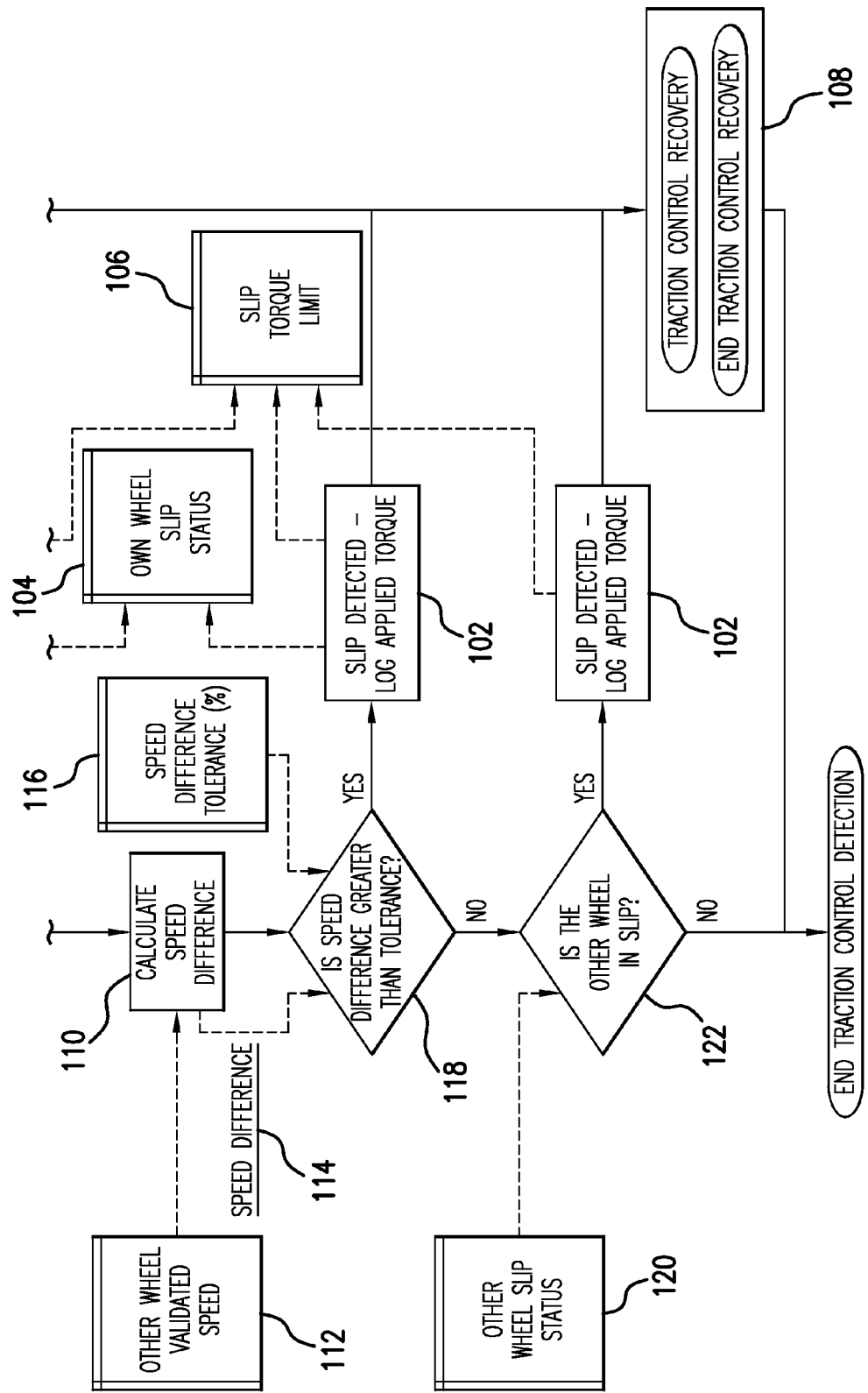
Figures 1, 4:
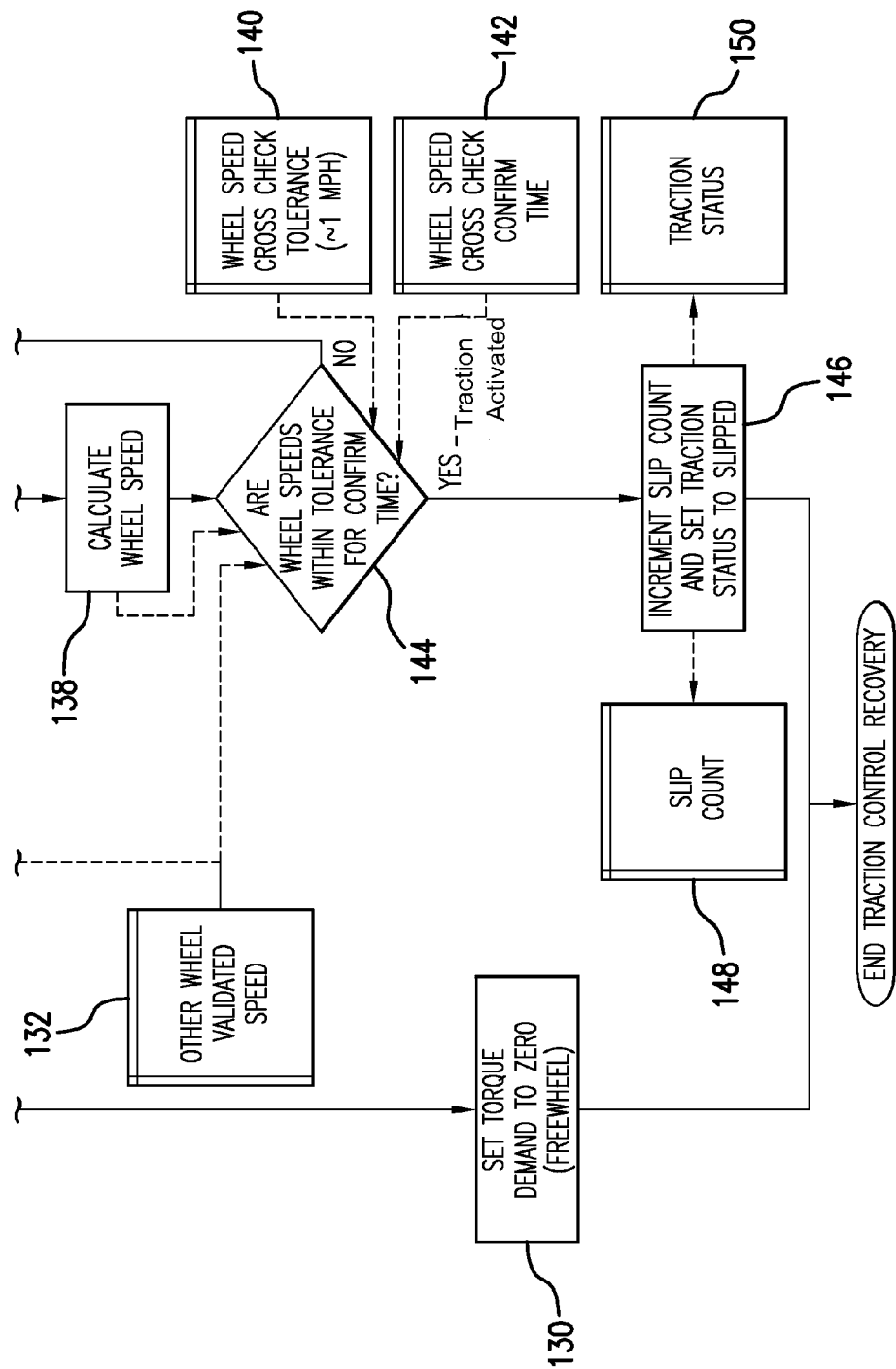
FIG. 4 is one embodiment of a flow chart depicting traction control recovery in a traction control system for an aircraft equipped with drive wheels for ground travel according to the present invention.

FIGS. 2-4 present flow charts reflecting possible embodiments of control algorithms for drive control and traction control useful with the present aircraft ground travel traction control system and method. These flow charts are presented as examples and are not intended to be limiting.

FIG. 2 shows one possible drive control algorithm with traction control elements according to the present invention. As shown in the key, solid arrows indicate process flow and dashed arrows indicate data flow. Delta items are indicated by the partially bordered boxes. The drive control process begins at 30. Signals are validated at 32. A signal that is validated is checked against all possible checks for its validity. For example, speed values are validated by being within an acceptable acceleration for their current value. The signals requiring validation are not listed in FIG. 2. In addition to speed, torque, acceleration, temperature, power, and/or any other parameters indicative of the operation of an aircraft ground travel system using drive wheels powered by drive means as described herein could also require validation. Traction control detection 34 follows signal validation. Data regarding traction status 36 determines whether traction status is set to slipped (38). If traction status is not set to slipped, data from a maximum torque limit timer 40 determines whether the maximum torque limit timer has expired (42). A negative response will lead to the application of torque (44) using a maximum applicable torque 46 and a validation of the torque demand 48, and an end to the drive control process. The expiration of the maximum torque limit timer will cause maximum applicable torque 46 to be set (50), the torque demand validated (48) and torque applied (44) to end drive control.

If the traction status is set to slipped, the slip count 52 and slip limit 54 are compared (56). If the slip count 52 is greater than the slip limit 54, the slip torque limit 58 and the slip clear time 60 are used to set a maximum applicable torque 62 to the slip torque limit for slip clear time using maximum torque limit timer 64 in step 66. Torque is applied with a wash in rate 68, the traction is set to normal 70, traction status data is sent to 80 and drive control is ended. If, however, the slip count 52 is not greater than the slip limit 54, the wash in rate is halved (72) in response to a demand wash in multiplier 74 before torque is applied with a wash in rate (68). The new wash in rate 76 is used to apply torque in step 68, as is maximum applicable torque 62 and a validated torque demand 78. "Wash in" refers to a process of dictating a rate to move a signal to a target value.

FIG. 3 illustrates box 34, one example of traction control detection, from FIG. 2 in more detail. The two drive wheels are referred to as own wheel and other wheel. In step 90, acceleration is calculated and compared to a threshold acceleration in step 92. The calculation of acceleration is based on own wheel's validated speed 94 and rolling actual speed from the last ten iterations 96. The acceleration threshold is based on own wheel's validated speed 94, rolling average speed from the last ten iterations 98, and an acceleration threshold average speed look up table 100. If acceleration is greater than the threshold, slip is detected and applied torque is logged (102), whereupon data is provided to own wheel slip status 104 and slip torque limit 106 locations prior to traction control recovery 108 and the end of traction control detection. If acceleration is not greater than the threshold, the speed difference is calculated (110) using the other wheel validated speed 112. The speed difference 114 and the speed difference tolerance 116, expressed as a percentage, are evaluated (118) to determine whether the speed difference 114 is greater than the speed difference tolerance 116. If the speed difference is greater than the speed difference tolerance, slip is detected and applied torque logged (102), as described above, and traction control recovery 108 is commenced and traction control detection is ended. If the speed difference is not greater than the speed difference tolerance, the other wheel's slip status 120 is evaluated to determine whether the other wheel is in slip (122). If the other wheel is in slip, slip is detected and applied torque is logged (102), leading to traction control recovery 108, as described above, and the end of traction control detection. If the other wheel is not in slip, traction control detection is ended, and drive control proceeds as described and shown in FIG. 2.

FIG. 4 shows one possible process of traction control recovery 108 from FIG. 3. Own wheel status 124 and other wheel status 126 are evaluated to determine whether slip is on own wheel (128). If slip is not on own wheel, torque demand is set to zero or freewheel (130), and traction control recovery is ended. If slip is on own wheel, other wheel validated speed 132 and deceleration wash out from other wheel look up table 134 are the basis for ramping down torque demand with wash out (136). Wheel speed is calculated (138), and this information, along with other wheel validated speed 132, is compared with wheel speed cross check tolerance 140 and wheel speed cross check confirm time 142 to determine whether wheel speeds are within tolerance for confirm time (144). If not, this information is fed back to step 136 for consideration in ramping down torque demand with wash out. "Wash out," as used herein, refers, like wash in, to a process of dictating a rate to move a signal to a target value. If the wheel speeds are within tolerance for confirm time, traction is achieved. This results in an increment slip count and a traction status set to slipped (146), and the data is transmitted to slip count 148 and traction status 150. Traction control recovery is then ended, traction control detection as shown and described in FIG. 3 is ended, and drive control can proceed according to FIG. 2.

It should be noted that the functions shown and described in the flow charts shown in FIGS. 2-4 are called from each other, and data values will be updated in the order in which they appear in the process flow. Therefore, if a data item near the beginning of the process flow, such as, for example slip count 148 in FIG. 4, is updated and then used later, such as at 52 in FIG. 2, the earlier value given to slip count at 148 will be used at 52. Additionally, the entire process is iterative, which is a consideration mainly for the drive control process of FIG. 2.

While the present invention has been described with respect to preferred embodiments, this is not intended to be limiting, and other arrangements and structures that perform the required functions are contemplated to be within the scope of the present invention.

INDUSTRIAL APPLICABILITY

The present invention will find its primary applicability in providing effective and reliable traction control during ground travel of aircraft equipped with onboard drive means that drive aircraft drive wheels to move the aircraft independently on the ground without reliance on the aircraft's brakes for traction control in a wide range of environmental conditions.

The invention claimed is:

1. A traction control system comprising an aircraft equipped with drive means capable of translating torque through a pair of aircraft drive wheels designed to move the aircraft independently on a ground surface, and traction control means for controlling the torque translated through said drive wheels in response to a difference between a detected speed of at least one of said drive wheels and a detected ground speed of said aircraft to optimize traction between said drive wheels and said ground surface, wherein said traction control means comprises signal means for receiving signals indicative of the detected wheel speed and the detected aircraft ground speed, traction control detection means for comparing wheel speed with actual aircraft ground speed to determining an occurrence of wheel slip, and drive control means for applying a torque selected to control traction and said drive means comprises a motor selected from the group comprising electric induction motors, permanent magnet brushless DC motors, switched reluctance motors, hydraulic motors, and pneumatic motors.

2. The traction control system of claim 1, wherein said pair of aircraft drive wheels are nose landing gear wheels.

3. The traction control system of claim 1, wherein said drive means is powered by a power source selected from the group consisting of an aircraft's auxiliary power unit, an aircraft's main engines, batteries, fuel cells, solar power, POWER CHIPS™, and burn boxes.

4. The traction control system of claim 1, wherein said drive means is located onboard an aircraft at a selected location inside an aircraft nose or main wheel, at a selected location adjacent to an aircraft nose or main wheel, at a selected location within the aircraft, or at a selected location attached to the aircraft airframe.

5. A traction control system comprising an aircraft equipped with a pair of drive wheels powered by onboard drive means capable of translating torque through said drive wheels to move said aircraft independently on a ground surface during ground travel, wherein said traction control system further comprises:

(a) sensor means associated with said drive wheels for obtaining information from said drive wheels and said onboard drive means relating to speed and torque of said drive wheels while said aircraft is traveling on the ground surface;

(b) aircraft speed and acceleration information means for determining directly or indirectly information relating to speed and acceleration of said aircraft while the aircraft is traveling on the ground surface;

(c) processor means in communication with said sensor means and said aircraft speed and acceleration information means to receive and monitor said information from said drive wheels and said information from said aircraft;

(d) intelligent software means in said processor for analyzing and comparing the information from the drive wheels and the information from the aircraft to determine a traction condition between said drive wheels and the ground surface;

(e) control means in communication with said drive wheels, said onboard drive means, said processor means, and intelligent software means to automatically modify torque or speed of said drive wheels or said onboard drive means as required in response to said traction condition; and (f) further comprising pilot input means manually actuatable to manually modify torque or speed of said drive wheels or said onboard drive means as required in response to said traction condition, wherein in response to said traction condition indicating an icy ground surface under one or more of said drive wheels, said pilot input means is manually actuated to cause said drive wheels to spin at a rate that melts the ice under said one or more drive wheels.

6. The traction control system of claim 5, wherein said drive wheels comprise a pair of wheels in an aircraft nose landing gear.

7. The traction control system of claim 5, wherein said sensor means comprises a sensor selected from the list consisting of speed sensors, torque sensors, and acceleration sensors.

8. A method for reliably and effectively controlling traction on a range of ground surface conditions in an aircraft equipped with controllable onboard wheel drive means for powering a pair of aircraft drive wheels to drive the aircraft on the ground surface conditions, comprising:

a. directly or indirectly determining the speed of each of a pair of aircraft drive wheels equipped with controllable onboard wheel drive means while said onboard wheel drive means are powering said drive wheels to drive the aircraft on a ground surface during ground travel, b. directly or indirectly determining the speed of the aircraft while the aircraft is driven on said ground surface, c. comparing the determined speed of said drive wheels and the determined speed of said aircraft and determining whether the compared determined speeds indicate a loss of traction control condition between said drive wheels and said ground surface, and d. without reliance on application of the aircraft's brakes while the aircraft is driven on said ground surface, when the loss of traction control condition is indicated, automatically or manually modifying the speed or torque of said onboard wheel drive means to power each of said drive wheels as required to match the speed of both of said drive wheels with the speed of the aircraft to maintain an optimum traction of said drive wheels on said ground surface.

9. The method of claim 8, further comprising detecting the loss of traction control condition in first one wheel and then in the other wheel of each one of said pair of drive wheels and modifying speed or torque to each wheel as required to maintain the optimum traction.

10. The method of claim 9, further comprising comparing the speeds of said drive wheels and said aircraft to a threshold speed or acceleration value to detect the loss of traction control condition of said one and said other wheels.

11. The method of claim 10, further comprising automatically performing the steps of the method and automatically modifying speed or torque as required to maintain the optimum traction.

12. The method of claim 11, further comprising, when the loss of traction control condition of at least one of said drive wheels is detected, torque demand is reduced, wheel speeds are determined to be within a desired tolerance, and traction control is recovered.

13. The method of claim 11, further comprising providing traction control controller means for acquiring, monitoring, storing, and processing data for ground surface and environmental conditions of a plurality of geographic locations where the aircraft is expected to be driven on the ground, automatically processing and providing said data to control the speed or torque of said onboard wheel drive means, and controlling speed of each of said drive wheels as required to control and maintain the optimum traction for the ground surface as the aircraft moves on the ground at one of said plurality of geographic locations.

14. The method of claim 8, further comprising manually performing the steps of the method by pilot input and a loss of traction condition is determined when pulsing faster and slower speed or torque commands to a drive wheel indicates that the wheel reacts more easily than would be expected in response to the commands.

15. A control system for automatically controlling aircraft drive wheel traction without reliance on the aircraft's brakes to keep the aircraft moving efficiently and autonomously on the ground under a range of environmental conditions, comprising:

a. in an aircraft equipped with a pair of drive wheels each powered by electric drive wheel motors to move the aircraft on a ground surface, wheel speed and torque determination means and aircraft ground speed determination means for directly or indirectly determining speed and torque of said drive wheels and speed of said aircraft while said aircraft is driven on the ground surface, a processor in communication with said wheel speed and torque determination means, said aircraft ground speed determination means, and selected control algorithms in control communication with said processor, said drive wheels, and said electric drive wheel motors;

b. a drive control algorithm adapted to control operation of said electric drive wheel motors to power the aircraft drive wheels and move the aircraft on the ground surface in response to validated signals indicative of aircraft drive wheel operating parameters and traction status;

c. a traction control detection algorithm adapted to operate with said drive control algorithm to control traction of said electric drive wheel motors in response to calculated acceleration, detected slip, and applied torque; and d. a traction control recovery algorithm adapted to operate with said traction control detection algorithm and said drive control algorithm to recover traction of the drive wheels.

16. A method for automatically controlling aircraft drive wheel traction without reliance on the aircraft's brakes to keep the aircraft moving efficiently and autonomously on the ground under a range of environmental conditions using the system of claim 15, comprising:
   a. using the drive control algorithm to validate signals indicative of aircraft drive wheel operating parameters and traction status comprising speed, acceleration, temperature, torque, or power to determine whether traction status is set to slipped, whether a maximum torque limit timer has expired, whether a maximum torque has been applied, and applying torque to said drive wheels in response to the determined traction status;
   b. using the traction control detection algorithm to compare acceleration of each of said drive wheels to a threshold acceleration value to detect slip in the drive wheel and log applied torque or to calculate and evaluate wheel speed difference and speed difference tolerance to detect slip and log applied torque, and traction control detection is ended or traction control recovery is required;
   c. using the traction control recovery algorithm to evaluate slip of each drive wheel and determining wheel speed and traction status, whether speeds of each drive wheel are within tolerance for confirm time, and whether traction has been achieved, ending traction control recovery when traction is achieved and continuing to use the drive control algorithm to operate the electric drive wheel motors to power the aircraft drive wheels and control traction while the aircraft is driven on the ground surface; and
   d. automatically updating the data and values and using the updated data and values and to automatically adjust drive wheel speed and torque to control traction.

\* \* \* \* \*